United States Patent
Lu et al.

(10) Patent No.: US 8,335,832 B2
(45) Date of Patent: Dec. 18, 2012

(54) METHOD FOR RELEASING BUFFERED DATA OF A SERVING GATEWAY

(75) Inventors: Fei Lu, Shenzhen (CN); Jinguo Zhu, Shenzhen (CN); Minya Ye, Shenzhen (CN)

(73) Assignee: ZTE Corporation, Shenzhen, Guandong Province (CN)

( * ) Notice: Subject to any disclaimer, the term of this patent is extended or adjusted under 35 U.S.C. 154(b) by 43 days.

(21) Appl. No.: 12/864,156

(22) PCT Filed: Jun. 19, 2008

(86) PCT No.: PCT/CN2008/071370
§ 371 (c)(1),
(2), (4) Date: Jul. 22, 2010

(87) PCT Pub. No.: WO2009/094871
PCT Pub. Date: Aug. 6, 2009

(65) Prior Publication Data
US 2010/0312846 A1   Dec. 9, 2010

(30) Foreign Application Priority Data

Jan. 25, 2008 (CN) .......................... 2008 1 0008594

(51) Int. Cl.
*G06F 15/16* (2006.01)
(52) U.S. Cl. .......................... 709/206; 709/205; 370/275
(58) Field of Classification Search .................. 709/205, 709/206; 370/275
See application file for complete search history.

(56) References Cited

U.S. PATENT DOCUMENTS

| | | | |
|---|---|---|---|
| 8,019,334 B2 * | 9/2011 | Koskela et al. | ............... 455/423 |
| 2002/0193110 A1 | 12/2002 | Julka et al. | |
| 2003/0076804 A1 | 4/2003 | Sivalingham | |
| 2006/0116151 A1 | 6/2006 | Sullivan et al. | |

FOREIGN PATENT DOCUMENTS

CN    1960506 A    5/2007
(Continued)

OTHER PUBLICATIONS

3GPP TS 36.300 V8.2.0 (Sep. 2007), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," Sep. 2007 (109 pages).

(Continued)

*Primary Examiner* — Adnan Mirza
(74) *Attorney, Agent, or Firm* — Clark & Elbing LLP

(57) ABSTRACT

A method for releasing buffered data of a Serving Gateway is disclosed☐ the Serving Gateway (Serving GW) buffers downlink data sent to a user and sends a data notification message to a Mobility Management Entity (MME); after receiving the data notification message, the MME initiates a paging to the user and sets a paging timer, if the paging timer expires and no paging response of the user is received, the MME sends a notification message to the Serving GW to inform the Serving GW that there is no paging response from the user; and after receiving the notification message, the Serving GW releases the buffered downlink data. With this method, the Serving GW can release buffered data in time without causing wrong release of the buffered data, so the system efficiency can be improved.

7 Claims, 3 Drawing Sheets

FOREIGN PATENT DOCUMENTS

| CN | 101022648 A | 8/2007 |
|---|---|---|
| CN | 101087475 A | 12/2007 |
| WO | WO 2005/107293 | 11/2005 |
| WO | WO 2006/114628 | 11/2006 |
| WO | WO 2007/055827 | 5/2007 |

OTHER PUBLICATIONS

Draft 3GPP TS23.401 V8.0.0+ (2008-), "3$^{rd}$ Generation Partnership Project; Technical Specification Group Services and System Aspects; General Packet Radio Service (GPRS) Enhancements for Evolved Universal Terrestrial Radio Access Network (E-UTRAN) Access (Release 8)," Jan. 2008 (174 pages).

Supplementary European Search Report for European Patent Application No. 08757779.7, search completed Oct. 10, 2011, mailed Oct. 18, 2011 (8 pages).

International Search Report issued in International Application No. PCT/CN2008/071370, search completed Oct. 6, 2008, mailed Oct. 23, 2008 (Chinese language and English translation) (4 pages).

International Preliminary Report on Patentability issued in International Application No. PCT/CN2008/071370, issued Jul. 27, 2010 (Chinese language and English translation) (8 pages).

Written Opinion of the International Searching Authority issued in International Application No. PCT/CN2008/071370, completed Oct. 14, 2008, mailed Oct. 23, 2008 (Chinese language and English translation) (6 pages).

* cited by examiner

METHOD FOR RELEASING BUFFERED DATA OF A SERVING GATEWAY

CROSS-REFERENCE TO RELATED APPLICATIONS

This application is the U.S. national stage filing under 35 U.S.C. §371 of international application PCT/CN2008/071370, filed Jun. 19, 2008, which claims benefit of Chinese Patent Application No. CN 200810008594.5, filed Jan. 25, 2008.

FIELD OF THE INVENTION

The present invention relates to system architecture evolution system, and especially, to a method for releasing buffered data of a serving gateway.

BACKGROUND ART

With the booming of the Wimax (World Interoperability for Microwave Access), to maintain the competence of the third generation mobile communication system in the field of mobile communication, it is necessary to improve its network performance and reduce its cost for network construction and operation. Therefore, the standardization working groups of the 3GPP (3$^{rd}$ Generation Partnership Project) are currently working at researching the evolution of the PS Core (Packet Switch Core) and the UTRAN (Universal Mobile Telecommunication System Radio Access Network), and this topic of this research is called the SAE (System Architecture Evolution), which aims at enabling the EPC (Evolved Packet Core) to provide a higher transmission rate and a shorter transmission delay, to optimize packeting and to support mobility management among the E-UTRAN (Evolved UTRAN), the UTRAN, the WLAN (Wireless Local Area Network) and other non-3GPP access networks.

FIG. 1 illustrates a current SAE system comprising the following network elements:

an E-RAN (Evolved RAN): providing higher uplink and downlink rates, a lower transmission delay and more reliable wireless transmission. The E-RAN includes network elements of eNodeB (Evolved NodeB) which provides wireless resources for user access.

A PDN (Packet Data Network): a network providing services to the users.

An MME (Mobility Management Entity): a control plane functional entity, a server which temporarily stores user data, in charge of managing and storing UE (User Equipment) context (such as UE identifier, mobility management state and user security parameters), assigning a temporary identifier for a UE, in charge of authenticating a UE residing in its tracking area or network; processing all non-access-stratum messages between the MME and the UE; triggering the paging in the SAE. The MME is a mobility management unit of the SAE system.

A serving GW (Gateway): the Serving GW is a user plane entity, in charge of user plane data route processing, buffering the downlink data sent to the UE in an idle state, managing and storing the SAE bearer contexts of the UE, such as IP bearer service parameters and network internal route information. The Serving GW is an anchor point of the user plane in the 3GPP system, and one user can only have one Serving GW at a certain moment.

A PDN GW: a gateway in charge of accessing the UE to the PDN, assigning an IP address for the UE, being also a mobility anchor point of the 3GPP and non-3GPP access systems, and the functions of the PDN GW further comprise policy enforcement and charging support. The UE can access multiple PDN GWs at the same moment. A PCEF (Policy and Charging Enforcement Function) is also located in the PDN GW.

A PCRF (Policy and Charging Rules Function): in charge of providing policy control and charging rules to the PCEF.

An HSS (Home Subscriber Server): permanently storing user subscribing data, the contents stored by the HSS comprise the IMSI (International Mobile Subscriber Identification) of the UE, the IP address of the PDN GW, the AMBR (Aggregate Maximum Bit Rate) corresponding to the PDN GW which is accessible to the users, and etc.

Physically, the Serving GW and the PDN GW may be integrated as one. The EPC system user plane network elements comprise the Serving GW and the PDN GW.

In the SAE system, the Serving GW has the function of buffering downlink data sent by the PDN GW to the UE which is in the idle state. When the UE is in the idle state, the Serving GW does not store therein the address and tunnel information of the eNodeB, when receiving the downlink data sent by the PDN GW to the UE, the Serving GW needs to buffer it and send a data notification message (Downlink Data Notification) to the MME; and the MME pages the UE. If the MME receives a paging response of the UE, the processing of a Service Request is performed, and in this process the MME informs the eNodeB of the Serving GW's address and tunnel information and informs the Serving GW of the eNodeB's address and tunnel information, thereby a data transmission tunnel on the S1 interface is established. The Serving GW sends the buffered data to the eNodeB via the tunnel, and the specific transmission flow is shown in FIG. 2 as follows:

Step 201, when the downlink data sent to the UE reaches the PDN GW, the PDN GW uses an existing bearer to route the received downlink data to the Serving GW;

Step 202, after receiving the downlink data, the Serving GW judges whether the address information and the tunnel information of the eNodeB to which the UE belongs are stored, if they are not stored, the Serving GW buffers the received downlink data which are sent to the UE and sends a data notification message to the MME;

Step 203, after receiving the data notification message, the MME initiates, according to a stored user location information Tracking Area List, paging requests to all eNodeBs in the user location information Tracking Area List, and starts a paging timer;

Step 204, the eNodeBs that have received the paging request page the UE at an air interface;

Step 205, when receiving the paging from a certain eNodeB, the UE sends a service request message to the eNodeB that has successfully paged the UE;

Step 206, after receiving the service request message, the eNodeB that has successfully paged the UE forwards the service request message to the MME;

Step 207, after receiving the service request message, the MME turns off the paging timer and sends a bearer establishment request to the eNodeB that has successfully paged the UE, and carries in the bearer establishment request the address information of the Serving GW, the uplink tunnel information at the Serving GW side of S1 interface of all the bearers and QoS (Quality of Service) information of all the bearers;

The address information of the Serving GW, the uplink tunnel information at the Serving GW side of S1 interface of all the bearers and the QoS (Quality of Service) information of all the bearers are stored in the MME by the UE in the idle state;

Step 208, after receiving the bearer establishment request, the eNodeB that has successfully paged the UE stores the uplink tunnel information at the Serving GW side of S1 interface of all the bearers, assigns air interface resources for them according to the QoS of the bearers, and initiates a radio bearer establishment request to the UE;

Step 209, after receiving the radio bearer establishment request, the UE performs establishment of radio bearers, and returns a radio bearer establishment response to the eNodeB that has successfully paged the UE after finishing the establishment of the radio bearers;

Step 210, after the eNodeB that has successfully paged the UE receives the radio bearer establishment response, the air interface portions of all the bearers have been successfully established, the eNodeB assigns downlink tunnel information to the S1 interface of all the bearers and returns a bearer establishment response to the MME, and the bearer establishment response carries therein the downlink tunnel information of the S1 interface of all the assigned bearers;

Step 211, after receiving the bearer establishment response, the MME initiates an update bearer request to the Serving GW for each bearer, and the update bearer request carries therein the downlink tunnel information of the S1 interface assigned for the bearer by the eNodeB that has successfully paged the UE and the address information of the eNodeB that has successfully paged the UE;

Step 212, after receiving the bearer establishment response, the Serving GW stores the downlink tunnel information of the S1 interface of the bearer and returns an update bearer response to the MME; a S1 data transmission tunnel between the eNodeB and the Serving GW is now established; and Step 213, the Serving GW sends to the UE the buffered data using the S1 data transmission tunnel and the air interface as established.

Through the above process, all the bearers of the user are activated, and the user and the PDN GW can transmit uplink and downlink data via all the bearers.

The problem at present lies in that the response for the paging of the UE can possibly not be obtained (for example, the user takes off the battery and thus cannot respond to the paging message), and at this time the Serving GW needs to release the buffered data. A current solution is to set a timer in the Serving GW for each UE to which paging has been triggered, and if the update bearer request of the MME is not received within a timing period (the above step 211), the Serving GW will release the buffered data. However, this solution has a disadvantage that the timing period of the timer in the Serving GW cannot be shorter than that of the paging timer in the MME, otherwise a problem will occur that the UE successfully responds to the paging while the Serving GW releases the buffered data; however, if the timing period of the timer of the Serving GW is longer than that of the paging timer of the MME, the buffered data of the Serving GW cannot be released in time, with a result that system resources are wasted and processing efficiency is lowered.

SUMMARY OF THE INVENTION

The technical problem to be solved by the present invention is to provide a method for releasing buffered data of a serving gateway, which can release the buffered data of the serving gateway in time while does not cause wrong release of the buffered data.

To solve the above mentioned technical problem, a method for releasing buffered data of a serving gateway of the present invention comprises: the Serving Gateway (Serving GW) buffers downlink data sent to a user and sends a data notification message to a Mobility Management Entity (MME); after receiving the data notification message, the MME initiates a paging to the user and sets a paging timer, if the paging timer expires and no paging response of the user is received, the MME sends a notification message to the Serving GW to inform the Serving GW that there is no paging response from the user; and after receiving the notification message, the Serving GW releases the buffered downlink data.

Further, if the paging timer expires and no paging response of the user is received, before sending the notification message to the Serving GW, the MME re-initiates paging to the related downlink eNodeBs at least once and restarts the paging timer at each time of initiating a paging, and if each paging timer expires and no paging response of the user is received, the MME then sends the notification message to the Serving GW.

Further, when the MME informs the Serving GW that there is no paging response, the notification message sent to it is an update bearer request message, a field showing no paging response from the user is carried in the update bearer request message.

Further, the Serving GW sets a flag of no paging response for the user after receiving the notification message.

Further, after receiving the downlink data of the user, the Serving GW judges whether the flag of no paging response for the user has been set, and then discards the downlink data if it has been set.

Further, when the user contacts the network on its own initiative, if the Serving GW has set the flag of no paging response for the user, it clears the set flag of no paging response.

Further, the manners that the user contacts the network on its own initiative comprise an attach procedure, a service request procedure and a tracking area update procedure initiated by the user.

Further, when the user contacts the network on its own initiative, clearing the set flag of no paging response by the Serving GW refers to that in the process that the user contacts the network, after the Serving GW receives the update bearer request from the MME, it clears the flag of no paging response set for the user.

In view of the above discussion, the present invention provides a method for releasing buffered data of a serving gateway, and with this method, the Serving GW can release buffered data in time without causing wrong release of the buffered data, so the system efficiency can be improved.

BRIEF DESCRIPTION OF THE ACCOMPANYING DRAWINGS

DETAILED DESCRIPTION OF THE INVENTION

The design thought of the present invention is described as follows: when a timing period of a paging timer of an MME expires, the MME sends a notification message of no paging response to a Serving GW to inform the Serving GW that there is no paging response from the user; after receiving the notification message of no paging response from the MME, the Serving GW releases the downlink data of the user that has been buffered.

In addition, after receiving the notification message of no paging response, the Serving GW may set a flag of no paging response for the user; when the user contacts the network on its own initiative (such as attach, service request and tracking area update), the Serving GW will clear the set flag of no paging response.

The present invention will be detailed hereinafter in conjunction with the drawings and the embodiment.

Figure 3:
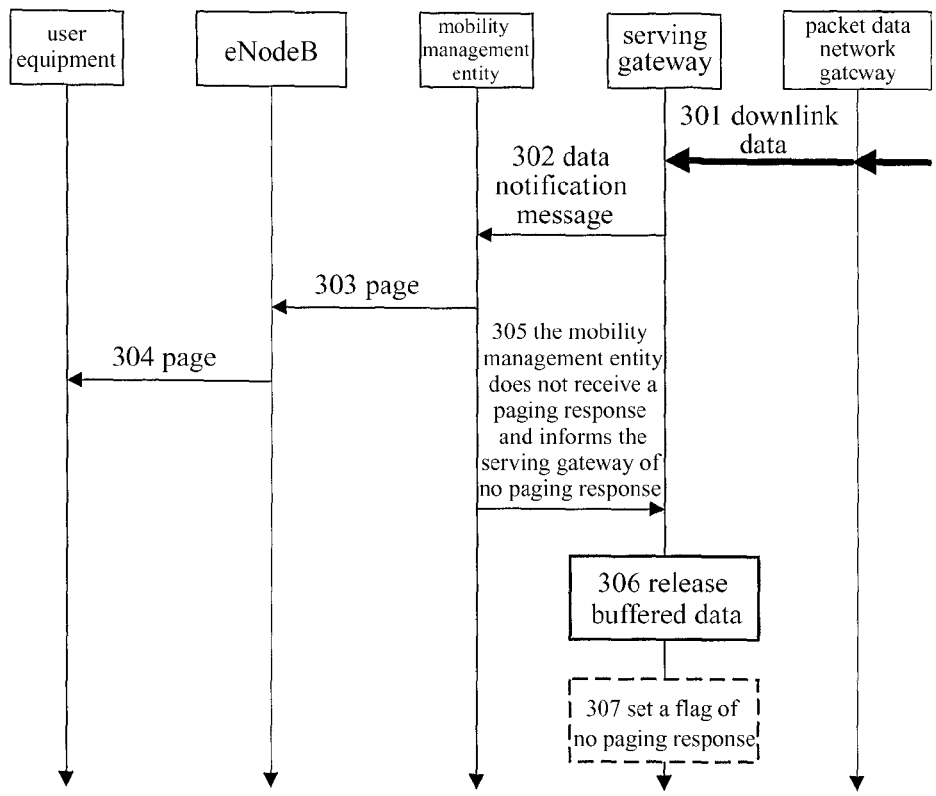
FIG. 3 is a flow chart that the Serving GW releases the buffered data.

As shown in FIG. 3, the flow that the Serving GW releases the buffered data comprises the following steps:

Step 301, when the downlink data to be sent to the UE reaches the PDN GW, the PDN GW uses an existing bearer to route the received downlink data to the Serving GW;

Step 302, after receiving the downlink data, the Serving GW judges whether the address information and the tunnel information of the eNodeB to which the UE belongs are stored, if they are not stored, the Serving GW buffers the received downlink data to be sent to the UE and sends a data notification message to the MME;

Step 303, after receiving the data notification message, the MME initiates, according to a stored user location information Tracking Area List, a paging request to all eNodeBs in the user location information Tracking Area List and starts a paging timer;

Step 304, the eNodeBs that have received the paging request page the UE at an air interface;

Step 305, when the paging timer started by the MME is time out, if the MME has not received a service request message from the UE, it judges that the UE does not respond to the paging and sends a notification message of no paging response to the Serving GW;

Optionally, after the timing of the paging timer of the MME has expired, the MME may initiate, according to configurations of an operator, a paging request again to all eNodeBs in the user location information Tracking Area List and restarts the paging timer. After multiple times of paging, if the MME still does not receive the service request message from the UE, it sends the notification message of no paging response to the Serving GW.

The MME can use the message for updating bearer request (Update Bearer Request) or other messages as the notification message of no paging response to inform the Serving GW of no response from the paging of the UE. For example, a field may be added in the Update Bearer Request message showing no response from the paging of the UE.

Step 306, the Serving GW releases the downlink data of the UE as buffered after receiving the notification message of no paging response sent by the MME; and Step 307 (optional), the Serving GW sets a flag of no paging response for the UE.

After receiving the notification of no response for paging, the Serving GW may reset the flag of no paging response for the user each time, and may also make further judgment, if the flag of no paging response has been set for the UE, there is no need to set again, the Serving GW performs setting only when the flag of no paging response has not been set.

Figure 4:
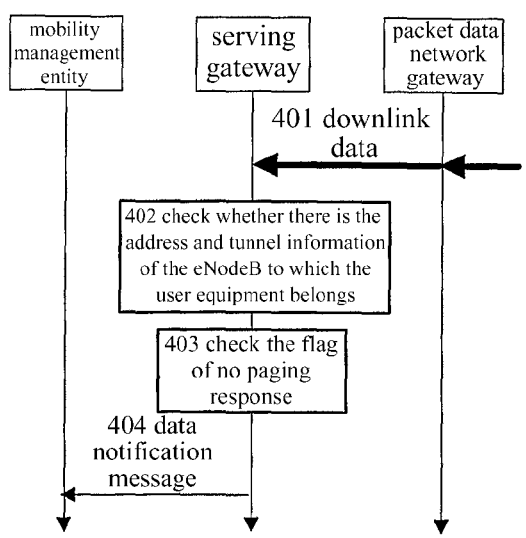
FIG. 4 is a flow chart of the processing of the Serving GW when there is a mechanism of setting a flag of no paging response.

As shown in FIG. 4, if the Serving GW has set the flag of no paging response for paging for the UE, the processing of the subsequently received downlink data to be sent to the UE comprises the following steps:

Step 401, when the downlink data to be sent to the UE reaches the PDN GW again, the PDN GW uses an existing bearer to route the received downlink data to the Serving GW;

Step 402, after receiving the downlink data, the Serving GW judges whether the address information and the tunnel information of the eNodeB to which the UE belongs are stored, if they are not stored, step 403 is executed;

Step 403, the Serving GW checks whether the flag of no paging response has been set for the UE, if the Serving GW has not set the flag of no paging response for the user, step 404 is executed; if the Serving GW has set the flag of no paging response for the user, it directly discards the received downlink data and the flow ends; and Step 404, the Serving GW buffers the received downlink data and sends a data notification message to the MME, and the MME initiates a paging for the UE.

Figure 1:
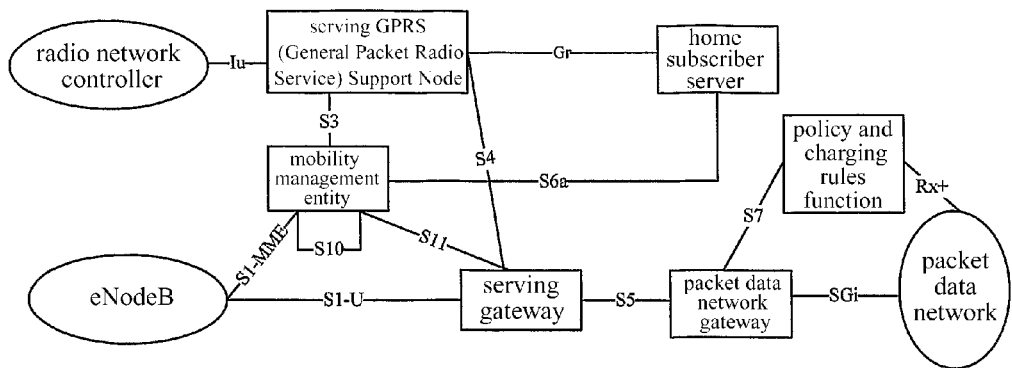
FIG. 1 is the architecture frame diagram of the SAE in the prior art.
Figure 2:
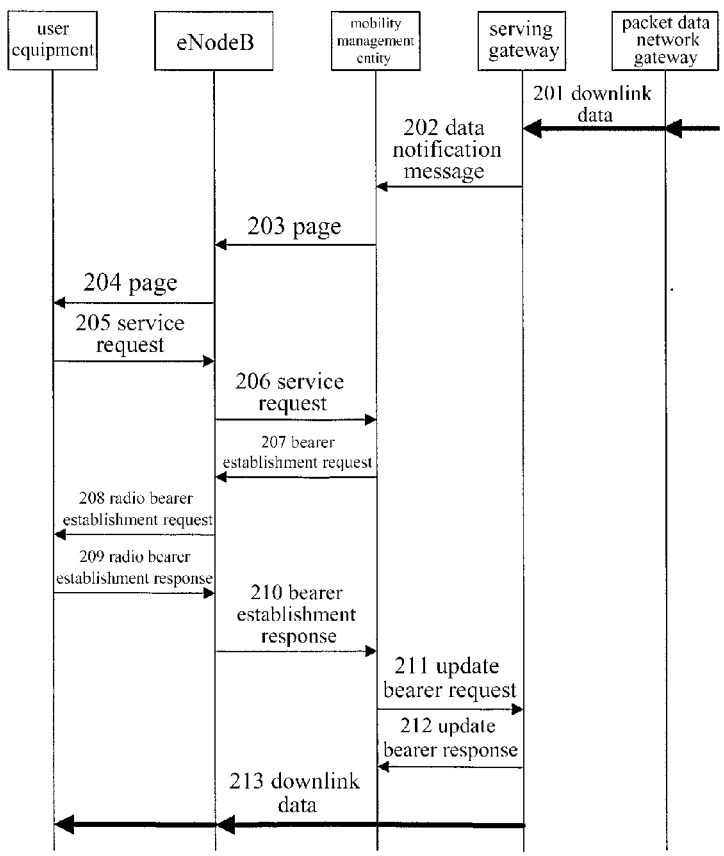
FIG. 2 is a flow chart of a service request initiated by the network in the prior art.

The subsequent steps can be completed according to FIG. 2 or 3. Thus, setting the flag of no paging response can avoid triggering more paging for UEs with no response, thereby saving air interface resources and avoiding buffering the downlink data to be sent to the UEs with no response.

Figure 5:
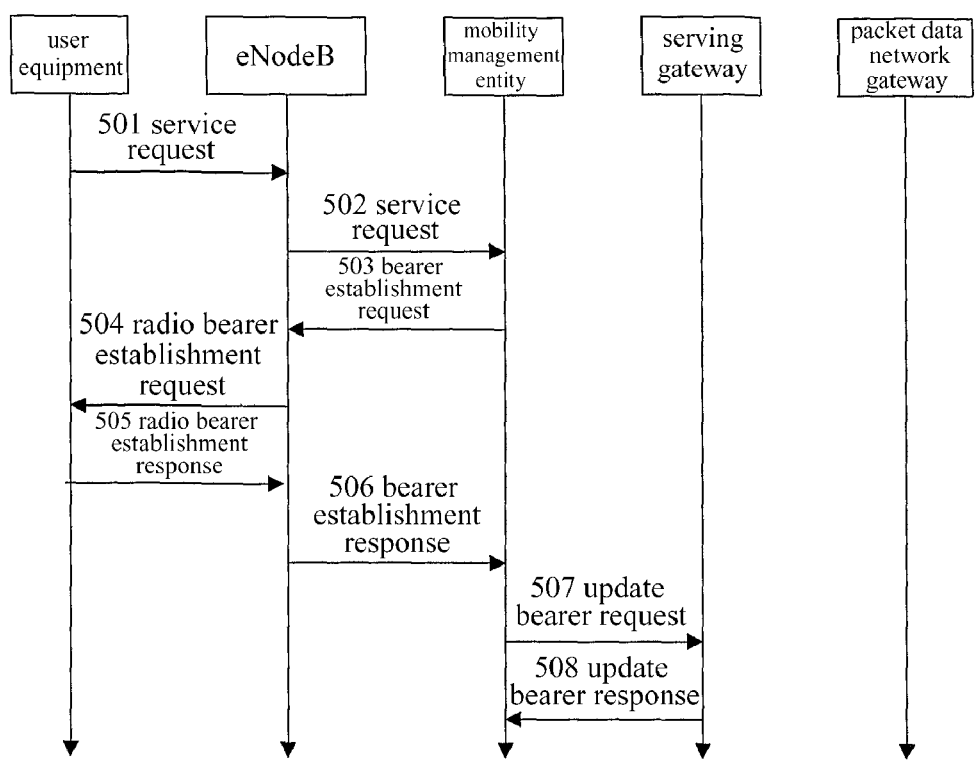
FIG. 5 is a flow chart that the user initiates a service request to the network and the Serving GW clears the flag of no paging response that has been set for the user.

If the Serving GW has set the flag of no paging response for a UE with no paging response, when the UE contacts the network (such as attach, service request and tracking area update), the flag of no paging response needs to be cleared, and FIG. 5 is a flow chart that the UE initiates a service request to the network and the Serving GW clears the flag of no paging response that has been set for the UE, comprising the following steps:

Step 501, the UE initiates a service request message to the eNodeB;

Step 502, the eNodeB forwards the service request message to the MME after receiving the service request message;

Step 503, after receiving the service request message, the MME initiates a bearer establishment request to the eNodeB, and carries in the bearer establishment request the address information of the Serving GW, the uplink tunnel information at the Serving GW side of S1 interface of all the bearers and the QoS information of all the bearers;

Step 504, after receiving the bearer establishment request, the eNodeB stores the uplink tunnel information at the Serving GW side of S1 interface of all the bearers, assigns air interface resources for the bearers according to the QoS of the bearers, and initiates a radio bearer establishment request to the UE;

Step 505, after receiving the radio bearer establishment request, the UE performs establishment of a radio bearer, and returns a radio bearer establishment response to the eNodeB that has successfully paged the UE after finishing the establishment of the radio bearer;

Step 506, after the eNodeB receives the radio bearer establishment response from the UE, the air interface portions of all the bearers have been successfully established, the eNodeB assigns downlink tunnel information to the S1 interface of all the bearers and returns a bearer establishment response to the MME, and the bearer establishment response carries therein the downlink tunnel information of the S1 interface of all the assigned bearers;

Step 507, after receiving the bearer establishment response, the MME initiates an update bearer request to the Serving GW for each bearer, and the update bearer request carries therein the downlink tunnel information of the S1 interface assigned by the eNodeB that has successfully paged the UE for the bearer and the address information of the eNodeB that has successfully paged the UE; and Step 508, after receiving one bearer establishment response, the Serving GW clears the flag of no paging response set for the UE; and stores the downlink tunnel information of the S1 interface of the bearer and returns an update bearer response to the MME.

When the UE contacts the network in other manners such as attach and tracking area update, the process that the Serving GW clears the flag of no paging response set for the UE is similar to embodiment 3 and can be derived easily.

As seen from the above embodiments, with the method according to the present invention, the Serving GW can release the buffered data in time. Meanwhile, since the Serving GW sets a flag of no paging response for the UE with no paging response, triggering more paging messages is avoided in the case of no response for paging from the UE, and thus air interface resources are saved.

What is claimed is:

1. A method for releasing buffered data of a Serving Gateway, comprising the steps of:
    the Serving Gateway, Serving GW, buffers downlink data sent to a user and sends a data notification message to a Mobility Management Entity, MME;
    after receiving the data notification message, the MME initiates a paging to the user and sets a paging timer, if the paging timer expires and no paging response of the user is received, the MME sends a notification message to the Serving GW to inform the Serving GW that there is no paging response from the user; and
    after receiving the notification message, the Serving GW releases the buffered downlink data,
    wherein if the paging timer expires and no paging response of the user is received, before sending the notification message to the Serving GW, the MME re-initiates paging to the related downlink eNodeBs at least once and restarts the paging timer at each time of initiating a paging, and if each paging timer expires and no paging response of the user is received, the MME then sends the notification message to the Serving GW.

2. The method according to claim 1, wherein when the MME informs the Serving GW that there is no paging response, the notification message sent to it is an update bearer request message, a field showing no paging response from the user is carried in the update bearer request message.

3. The method according to claim 1, wherein the Serving GW sets a flag of no paging response for the user after receiving the notification message.

4. The method according to claim 3, wherein after receiving the downlink data of the user, the Serving GW judges whether the flag of no paging response for the user has been set, and then discards the downlink data if it has been set.

5. The method according to claim 4, wherein when the user contacts the network on its own initiative, if the Serving GW has set the flag of no paging response for the user, it clears the set flag of no paging response.

6. The method according to claim 5, wherein the manners that the user contacts the network on its own initiative comprise an attach procedure, a service request procedure and a tracking area update procedure initiated by the user.

7. The method according to claim 6, wherein when the user contacts the network on its own initiative, clearing the set flag of no paging response by the Serving GW refers to that in the process that the user contacts the network, after the Serving GW receives the update bearer request from the MME, it clears the flag of no paging response set for the user.

* * * * *